United States Patent [19]

Nomura

[11] Patent Number: 5,327,362
[45] Date of Patent: Jul. 5, 1994

US005327362A

[54] SYSTEM FOR DETECTING A RUNAWAY OF A MICROCOMPUTER

[75] Inventor: Masahiro Nomura, Tokyo, Japan

[73] Assignee: NEC Corporation, Tokyo, Japan

[21] Appl. No.: 821,787

[22] Filed: Jan. 16, 1992

[30] Foreign Application Priority Data

Jan. 16, 1991 [JP] Japan .................................. 3-002993

[51] Int. Cl.⁵ ............................................. G06F 11/00
[52] U.S. Cl. .................................. 364/580; 371/16.3;
371/62; 395/575
[58] Field of Search ................. 371/16.3, 62; 364/580,
364/551.01, 550, 184; 395/575

[56] References Cited

U.S. PATENT DOCUMENTS

| 4,752,930 | 6/1988 | Kitamura et al. ............. 371/16.3 X |
| 4,903,193 | 2/1990 | Nakamura ......................... 371/62 X |
| 5,136,704 | 8/1992 | Danielsen et al. .................. 395/575 |
| 5,155,846 | 10/1992 | Mino .................................. 395/575 |

*Primary Examiner*—Jack B. Harvey
*Assistant Examiner*—Eric W. Stamber
*Attorney, Agent, or Firm*—Whitham, Curtis & Whitham

[57] ABSTRACT

A system for detecting a runaway of a microcomputer includes a microcomputer which carries out a predetermined program having at least two detecting routines and supplies at least two passing signals by carrying out the detecting routines, and a control unit for detecting the at least two passing signals. The control unit provides a runaway signal representing that the runaway occurs, when at least one of the at least two passing signals is not detected in a predetermined time.

3 Claims, 6 Drawing Sheets

| CASE | REGISTER 110 | CLEAR REQUEST SIGNAL 108 | AND GATE 112 DETECTING SIGNAL 115 | AND GATE 114 CLEAR SIGNAL 116 | OVERFLOW SIGNAL 22 |
|---|---|---|---|---|---|
| I | 0 | 0 | 0 | 0 | 1 |
| II | 0 | 1 | 1 | 0 | 0 |
| III | 1 | 0 | 0 | 0 | 1 |
| IV | 1 | 1 | 0 | 1 | 0 |

FIG.6

SYSTEM FOR DETECTING A RUNAWAY OF A MICROCOMPUTER

FIELD OF THE INVENTION

This invention relates to a system for detecting a runaway of a microcomputer and, more particularly, to a microcomputer system having a function for detecting a runaway (incorrect operation) of a program.

BACKGROUND OF THE INVENTION

A conventional microcomputer system includes a microcomputer, a memory for storing a predetermined program connected to the microcomputer, and a timer (watch-dog-timer) connected to the microcomputer for detecting a runaway of a program in the microcomputer. The microcomputer carries out a program including a predetermined routine for checking running of the program. The timer times a running time of the microcomputer, before a timer clear command is conducted.

In operation, when a program runs on the check routine during normal operation, a clear signal is supplied to the timer from the microcomputer, so that the timer is reset. On the other hand, if the program does not pass on the check routine within a predetermined time, the timer supplies an overflow signal to the microcomputer which is thereby informed that a runaway of the program occurs therein. Therefore, a predetermined routine for removing the runaway is carried out in the microcomputer.

However, the conventional microcomputer system has a disadvantage in that there is a possibility that a runaway is not detected in a case where the timer is reset without conducting a predetermined program, and where operation falls in a non-limited loop including the conduct of the timer clear, so that the timer is reset each time in the loop.

SUMMARY OF THE INVENTION

Accordingly, it is an object of the invention to provide a system for detecting a runaway of a microcomputer in which a runaway is detected certainly.

According to the invention, a system for detecting a runaway of a microcomputer includes:

a microcomputer which carries out a predetermined program having at least two predetermined routines for detecting a runaway of the predetermined program, and supplies at least two passing signals by carrying out the at least two predetermined routines; and means for detecting the at least two passing signals;

wherein the detecting means provides a runaway signal representing that the runaway occurs, when at least one of the at least two passing signals is not detected in a predetermined time.

BRIEF DESCRIPTION OF THE DRAWINGS

The invention will be explained in more detail in conjunction with appended drawings; wherein:

FIG. 6 is a timing Table for explaining a first embodiment of the invention.

DESCRIPTION OF THE PREFERRED EMBODIMENTS

Figure 1:
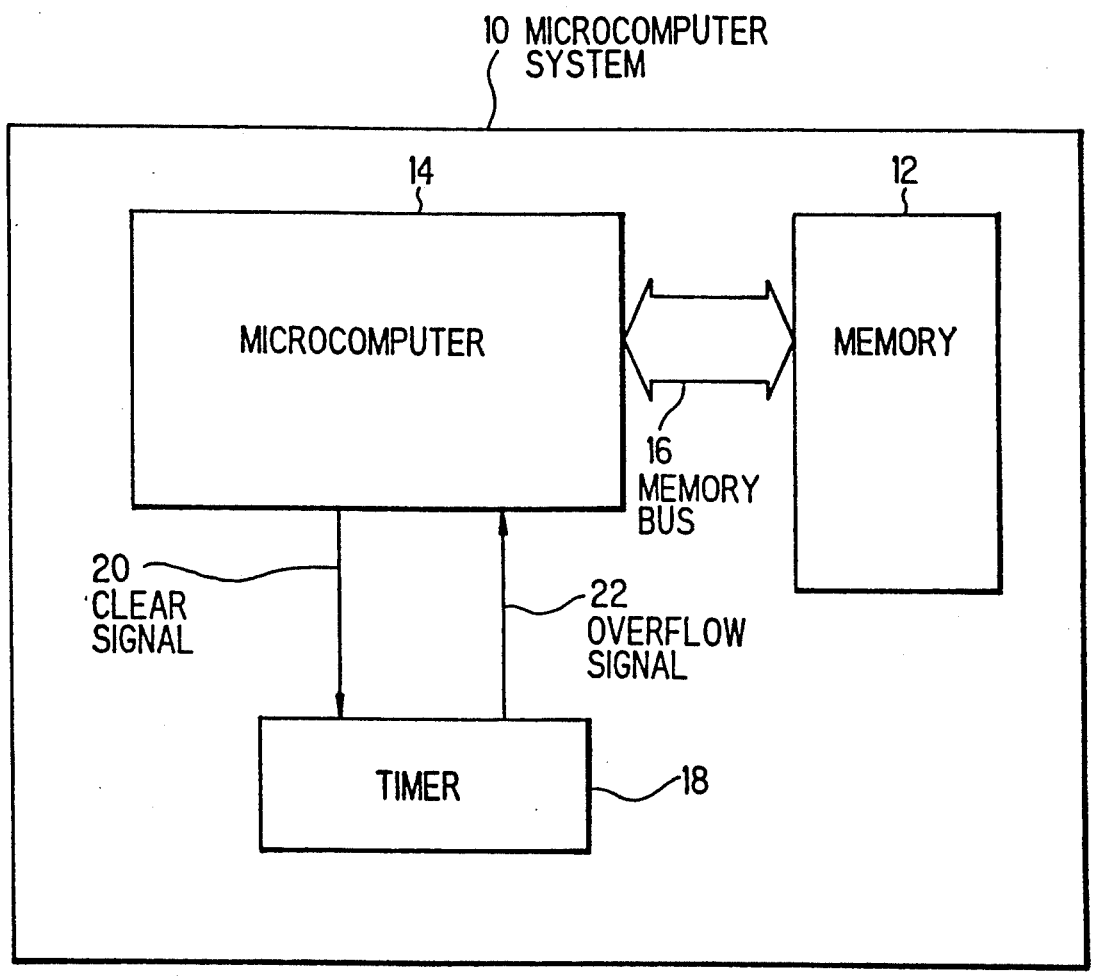
FIG. 1 is a block diagram showing a conventional microcomputer system.

Before describing a system for detecting a runaway of a microcomputer according to the invention, the aforementioned conventional microcomputer system will be explained in conjunction with FIG. 1.

A conventional microcomputer system 10 includes a memory 12 for storing a predetermined program, a microcomputer 14 connected to the memory 12 by a memory bus 16, and a timer 18 (watch-dog-timer) connected with the microcomputer 14 for detecting a runaway of a program. The microcomputer 14 carries out a program including a predetermined routine for checking a runaway, and supplies a clear signal 20 to the timer 18, when a program passes on the check routine. The timer 18 times a running time of the microcomputer 14, and is reset by the clear signal 20 from the microcomputer 14. The timer 18 supplies an overflow signal 22 to the microcomputer 14 when the clear signal 20 is not supplied from the microcomputer 14 within a predetermined time.

In operation, when the program runs the check routine during normal operation, the clear signal 20 is supplied from the microcomputer 14 to the timer 18, so that the timer 18 is reset. On the other hand, if the program does not pass on the check routine within the predetermined time, the clear signal 20 is not supplied to the timer 18. Therefore, the timer 18 supplies the overflow signal 22 to the microcomputer 14 which is thereby informed that a runaway of the program occurs therein. In accordance with the overflow signal 22, a predetermined routine for removing the runaway is carried out in the microcomputer 14.

As described before, however, the conventional microcomputer system 10 has a disadvantage in that there is a possibility that a runaway is not detected in a case where the timer 18 is reset without conducting a predetermined program, and where operation falls in a non-limited loop including the conduct of the timer clear, so that the timer 18 is reset each time in the loop.

Figure 2:
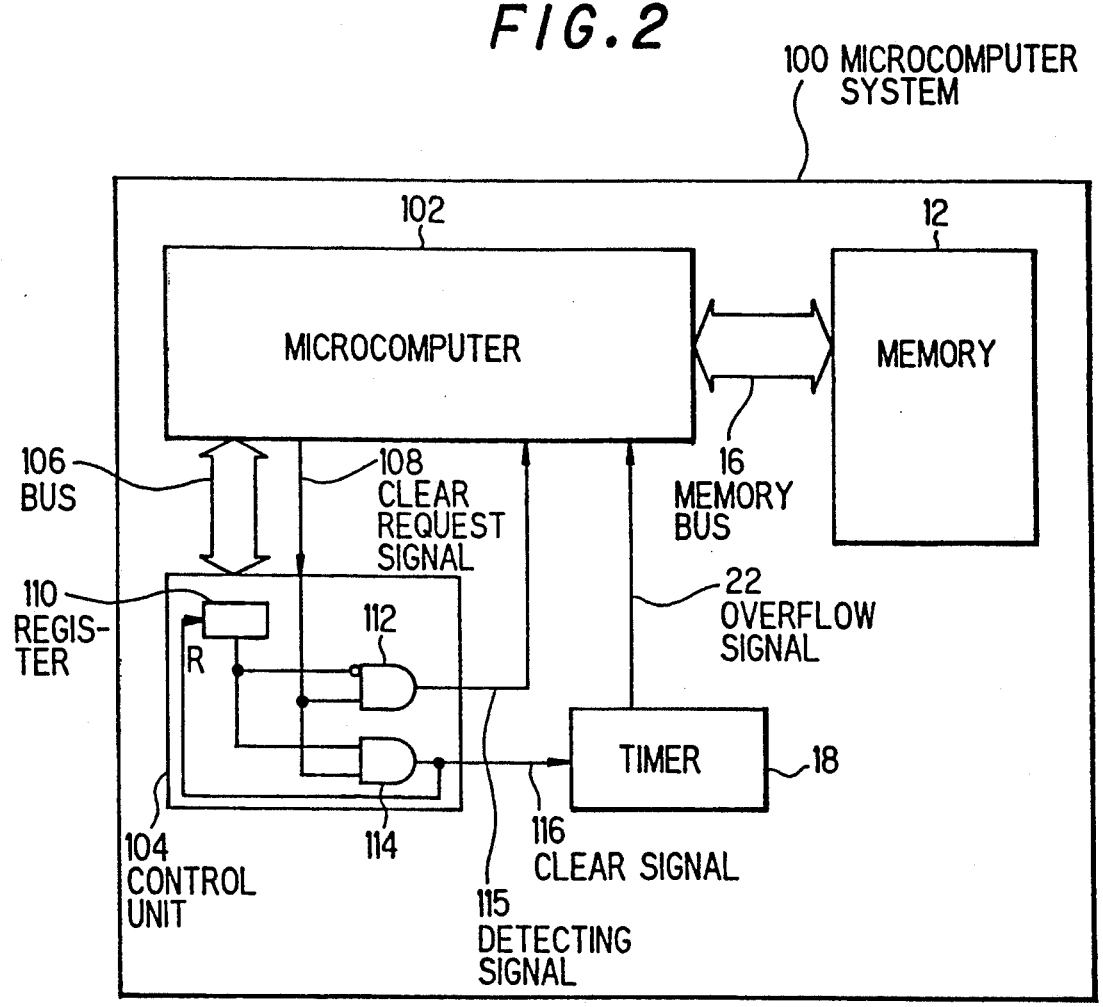
FIG. 2 is a block diagram showing a system for detecting a runaway of a microcomputer of a first preferred embodiment according to the invention.

Next, a system for detecting a runaway of a microcomputer of a first preferred embodiment according to the invention will be explained in conjunction with FIG. 2. A microcomputer system 100 includes a memory 12 for storing a predetermined program, a microcomputer 102 connected to the memory 12 by a memory bus 16, a control unit 104 connected to the microcomputer 102 by a bus 106, and a timer 18 (watchdog-timer) connected with the microcomputer 102 and the control unit 104.

The microcomputer 102 carries out a program including two predetermined check routines (routine 4 and routine 6 in FIG. 3), and supplies a clear request signal 108 to the control unit 104, when a program passes on the check routine 6.

The control unit 104 includes a register 110 of one bit connected with the microcomputer 102, and AND gates 112 and 114. The register 110 supplies a high level signal to the AND gates 112 and 114 in accordance with a signal supplied from the microcomputer 102 when the program passes on the check routine 4. The AND gate 112 is supplied with a content of the register 110 at an inverted input terminal and the clear request signal 108 from the microcomputer 102 at a non-inverted input terminal, and supplies an output signal (detecting signal 115) to the microcomputer 102. The AND gate 114 is supplied with the output signal of the register 110 and the clear request signal 108, and supplies an output signal (clear signal 116) to the timer 18 to control an output (overflow signal 22) of the timer 18 and to the register 110 to be reset.

The timer 18 is reset by the clear signal 116, while the timer supplies an overflow signal 22 to the microcomputer 102, when the clear signal 116 is not supplied from the microcomputer 14 within a predetermined time for carrying out the routine 6.

Figure 3:
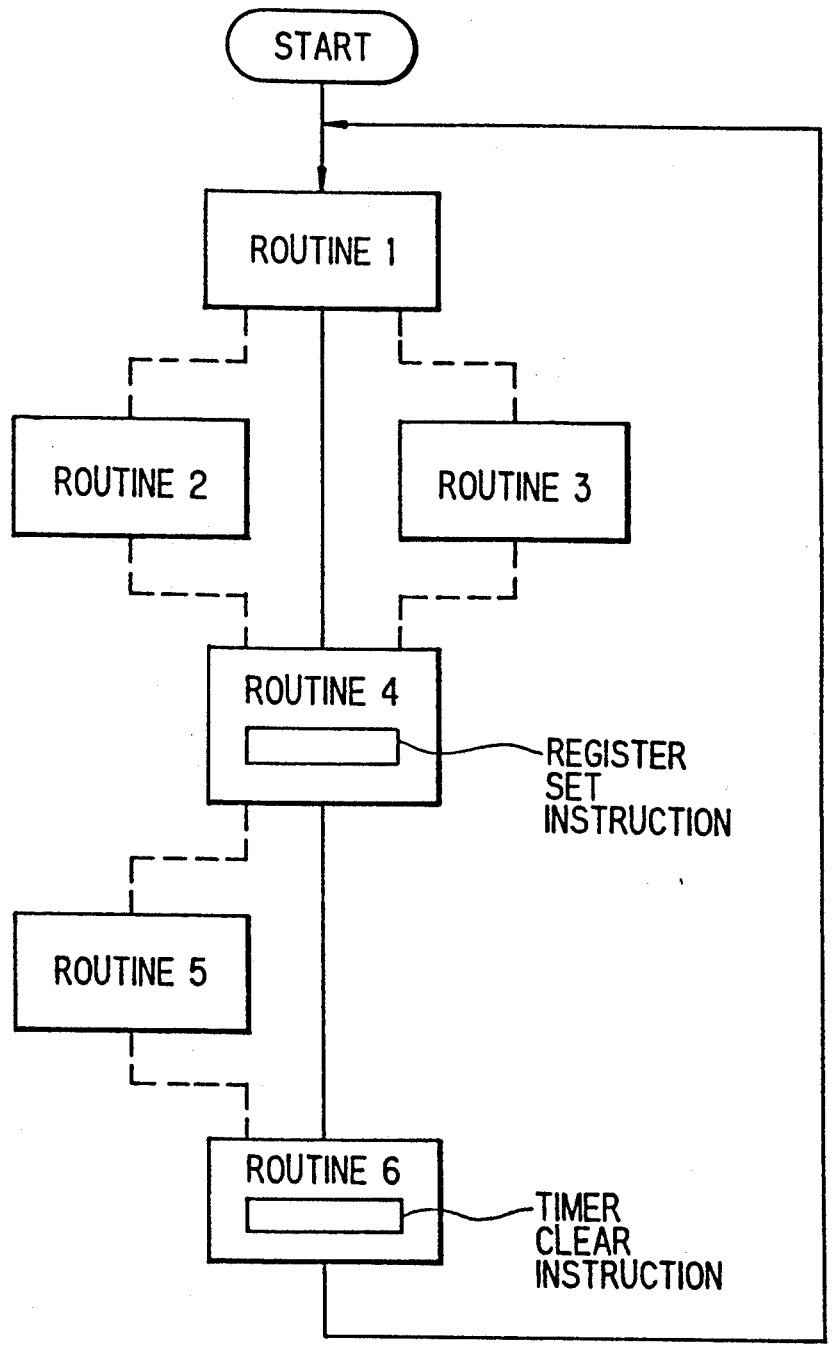
FIG. 3 is a flow chart showing operation of the first preferred embodiment.

Next, operation of the first preferred embodiment will be explained in conjunction with FIG. 3 and a timing table shown in FIG. 6.

In this example, a program composed of six routines (routine 1 to routine 6) in which the routines 1, 4 and 6 are program groups to be conducted unconditionally, while the routines 2, 3 and 5 are program groups to be conducted under predetermined conditions is stored in the memory 12. In this program, the routine 4 includes an instruction for setting the register 110, and the routine 6 includes a clear request for resetting the timer 18.

CASE I

When the routines 4 and 6 are not carried out within the predetermined time, the register 110 is not set, and the clear request signal 108 is not supplied to the control unit 104, so that the clear signal 116 is not supplied from the control unit 104 to the timer 18. Therefore, the overflow signal 22 is supplied from the timer 18 to the microcomputer 102.

CASE II

When the routine 4 is not carried out, while the routine 6 is carried out within the predetermined time, the detecting signal 115 is supplied from the control unit (the AND gate 112) to the microcomputer 102.

CASE III

When the routine 4 is carried out and the routine 6 is not carried out within the predetermined time, the detecting signal 115 and the clear signal 116 are not supplied from the control unit 104. Therefore, the overflow signal 22 is supplied from the timer 18 to the microcomputer 102.

CASE IV

When the program runs on a normal pass, the routines 4 and 6 are carried out within the predetermined time, so that the detecting signal 115 is not supplied to the microcomputer 102 and the clear signal 116 is supplied to the timer 18. Therefore, the timer 18 is reset, so that the overflow signal 22 is not supplied to the microcomputer 102.

When the detecting signal 115 or the overflow signal 22 is supplied to the microcomputer 102, the runaway removing routine is carried out in the microcomputer 102.

Next, second and third preferred embodiments according to the invention will be explained in conjunction with FIGS. 4 and 5. It is noted that detailed explanation of the same or corresponding structure and operation as the first preferred embodiment will be omitted to avoid overlapped explanation.

Figure 4:
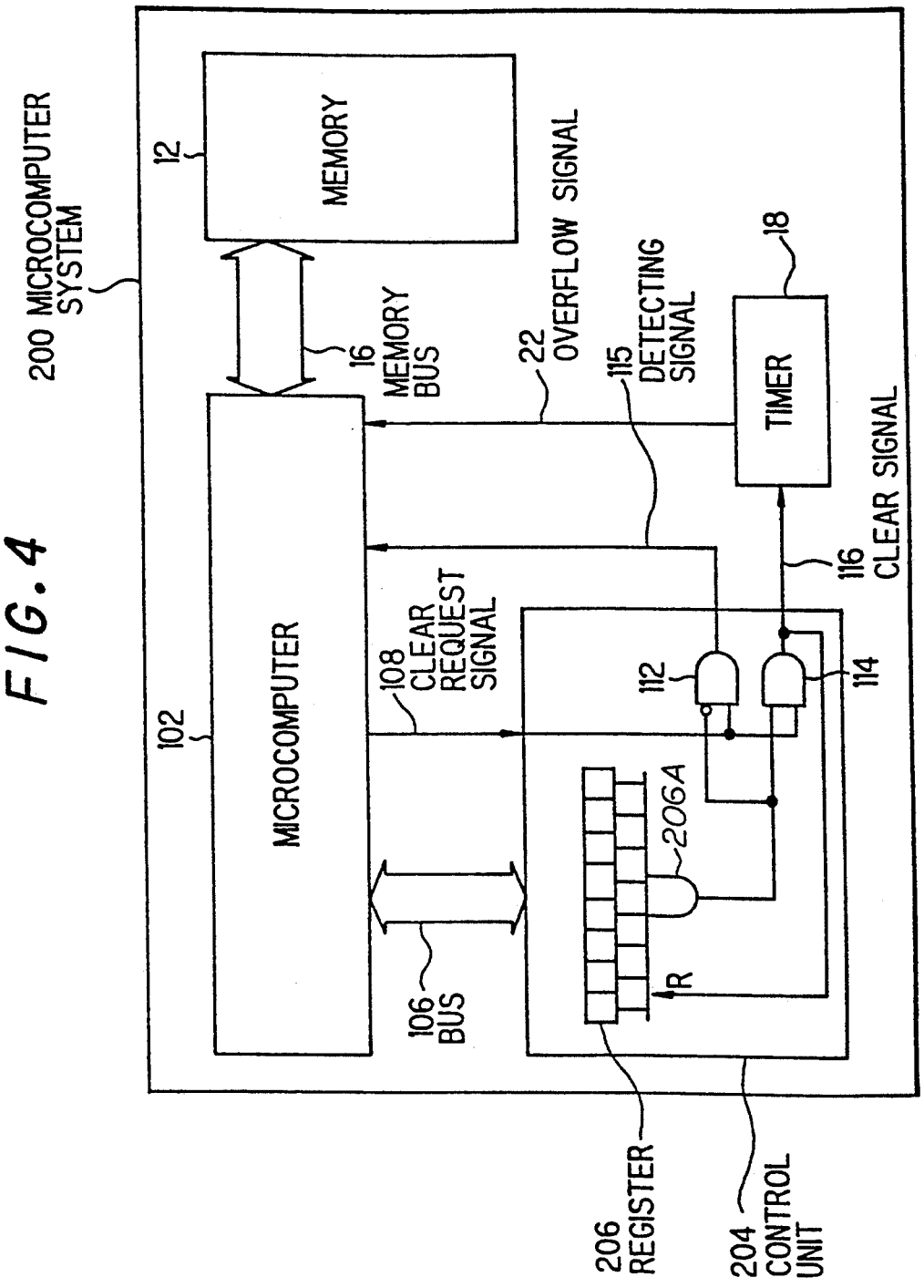
FIG. 4 is a block diagram showing a system for detecting a runaway of a microcomputer of a second preferred embodiment according to the invention.

FIG. 4 shows a system for detecting a runaway of a microcomputer of a second preferred embodiment according to the invention. A microcomputer system 200 includes a memory 12 for storing a predetermined program, a microcomputer 102 connected to the memory 12 by a memory bus 16, a control unit 204 connected to the microcomputer 102 by a bus 106, and a timer 18 connected with the microcomputer 102 and the control unit 204.

The memory 12 stores a program having eight check routines which are carried out unconditionally.

The control unit 204 is composed of a register 206 of eight bits connected to an AND gate 206A and AND gates 112 and 114. The AND gate 112 is connected at an inverted input terminal to the AND gate 206A, and at a non-inverted input terminal to a line for a clear request signal 108, supplied from the microcomputer 102, and the AND gate 114 is connected at input terminals to the AND gate 206A and the clear request signal line, respectively. The register 206 becomes high at each bit when each of the eight check routines is conducted, so that an output signal of AND gate 206A becomes high only when all of the eight check routines are completely carried out.

In the microcomputer system 200, when the program runs on a normal pass, a program passes on all of the check routines, so that the detecting signal 115 is not supplied from the control unit 204 to the microcomputer 102. On the other hand, even if the program does not pass on at least one of the eight check routines, the detecting signal 115 is supplied from the control unit 204. According to the microcomputer system 200, therefore a runaway of a program can be detected more certainly than the system 100 of the first preferred embodiment.

Figure 5:
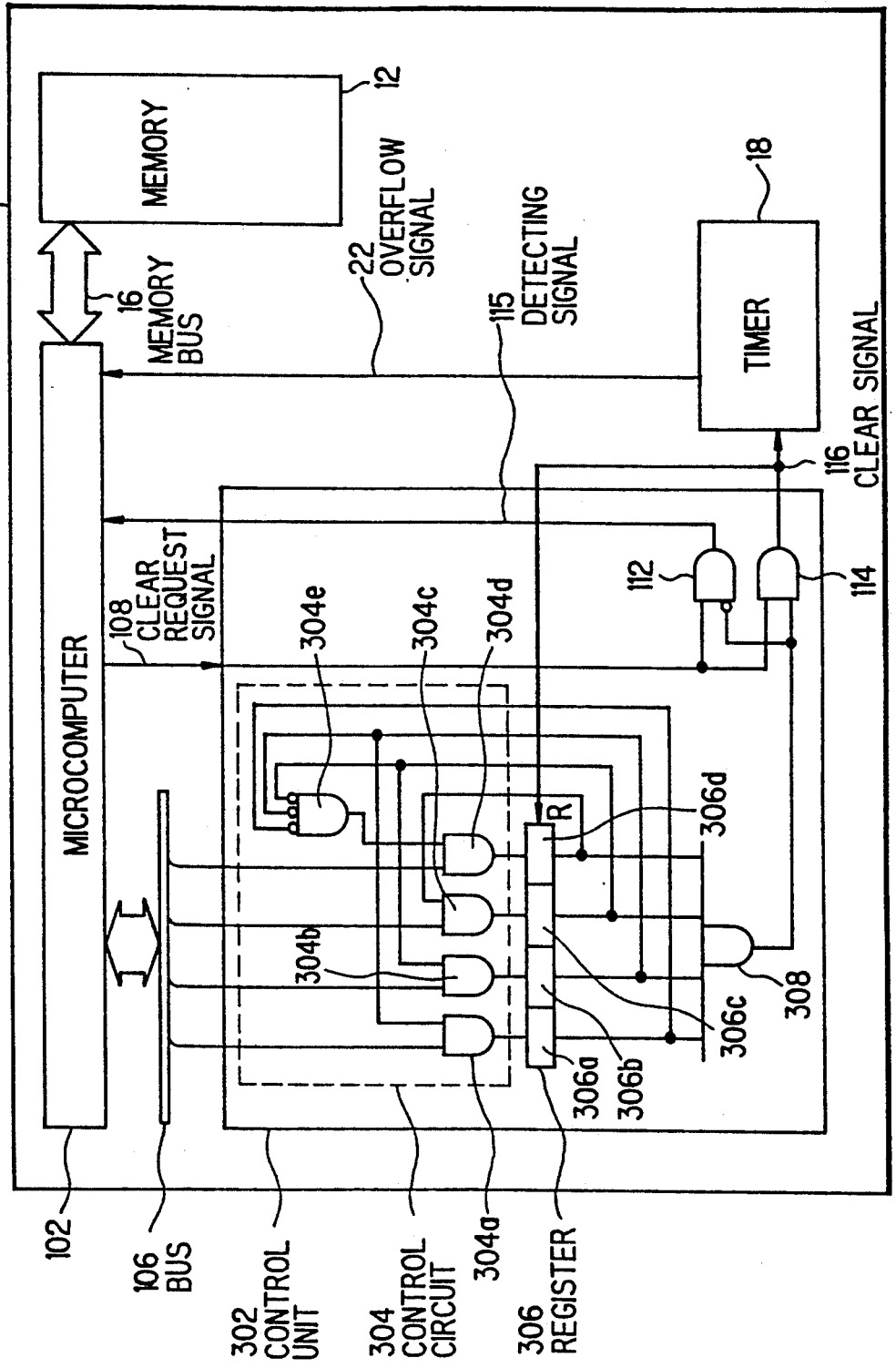
FIG. 5 is a block diagram showing a system for detecting a runaway of a microcomputer of a third preferred embodiment according to the invention.

FIG. 5 shows a system for detecting a runaway of a microcomputer of a third preferred embodiment according to the invention. A microcomputer system 300 includes a memory 12 for storing a predetermined program, a microcomputer 102 connected to the memory 12 by a memory bus 16, a control unit 302 connected to the microcomputer 102 by a bus 106, and a timer 18 connected with the microcomputer 102 and the control unit 302.

The memory 12 stores a program having four check routines which are carried out unconditionally in order. The control unit 302 is composed of a control circuit 304, register 306 of four bits 306a, 306b, 306c and 306d, and AND gates 112, 114 and 308. The control circuit 304 is composed of five AND gates 304a, 304b, 304c, 304d and 304e. The AND gates 304a, 304b, 304c and 304d are connected at one of inputs to the bus 106 and at outputs to the register bits 306a, 306b, 306c and 306d, respectively. The AND gate 304e is connected at inverted inputs to outputs of the register bits 306a, 306b and 306c, and at an output to the remaining input of the AND gate 304d. The AND gates 304a, 304b and 304c are connected at the remaining inputs to outputs of the register bits 306b, 306c and 306d, respectively.

In the microcomputer system 300, when the program runs on all of the check routines in a programmed order during normal operation, the detecting signal 115 is not supplied from the control unit 302 to the microcomputer 102. In the programmed order, when all contents of the register 306 are low, an output of the AND gate 304e which is high is supplied to the first input of the AND gate 304d. At this time, the AND gate 304d is supplied at the second input with a high level signal from the microcomputer 102 because of carrying out the first order check routine, so that the bit 306d of the register 306 becomes high. Then, the AND gate 304c is supplied at the first input with a high level signal from the register bit 306d and at the second input with a high level signal from the microcomputer 102 because of carrying out the second order check routine, so that the bit 306c of the register 306 becomes high. Thus, the bits 306b and 306a of the register 306 becomes high because of carrying out the third and fourth order check routines in order.

On the other hand, when the program does not pass on at least one check routine or in a wrong order, the detecting signal 115 is supplied from the control unit 302. According to the microcomputer system 300, therefore, a runaway of a program can be detected more certainly than the systems 100 and 200 of the first and second preferred embodiment.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A system for detecting a runaway of a microcomputer, comprising:
    a memory storing a predetermined program having at least two predetermined check routines for detecting a runaway condition of said predetermined program;
    a microcomputer which carries out said predetermined program and supplies at least two passing signals by carrying out said at least two predetermined check routines, a first one of said passing signals being a set signal and a second succeeding one of said passing signals being a clear request signal;
    a control unit responsive to said at least two predetermined check routines and including a register set by said first one of said passing signals and logic means responsive to a state of said register and said second succeeding one of said passing signals for generating a detecting signal if said register is not set when said clear request signal is generated by said microcomputer and a clear signal if said register is set when said clear request signal is generated; and
    a timer reset by said clear signal, said timer generating an overflow signal to said microcomputer if not reset before a predetermined count is reached, either of said detecting signal or said overflow signal indicating a runaway condition.

2. The system for detecting a runaway of a microcomputer recited in claim 1 wherein said predetermined program has n predetermined check routines greater, where n is greater than two, for detecting a runaway condition of said predetermined program, said microcomputer generating n−1 first passing signals and said register comprises n−1 stages respectively set by a corresponding one of said n−1 passing signals, further comprising an AND gate connected to each stage of said register and providing an output to said logic means only if all stages of said register are set.

3. The system for detecting a runaway of a microcomputer recited in claim 2 further comprising a control unit responsive to outputs of said register to permit setting of individual stages by said first passing signals only when said first passing signals are generated in a predetermined order.

* * * * *